(12) United States Patent
Selcuk

(10) Patent No.: US 9,243,335 B2
(45) Date of Patent: Jan. 26, 2016

(54) METAL SUBSTRATE FOR FUEL CELLS

(75) Inventor: Ahmet Selcuk, West Sussex (GB)

(73) Assignee: CERES INTELLECTUAL PROPERTY COMPANY LIMITED, West Sussex (GB)

( * ) Notice: Subject to any disclaimer, the term of this patent is extended or adjusted under 35 U.S.C. 154(b) by 1747 days.

(21) Appl. No.: 12/307,834

(22) PCT Filed: Jul. 6, 2007

(86) PCT No.: PCT/GB2007/002518
§ 371 (c)(1),
(2), (4) Date: Oct. 19, 2009

(87) PCT Pub. No.: WO2008/003976
PCT Pub. Date: Jan. 10, 2008

(65) Prior Publication Data
US 2010/0062317 A1    Mar. 11, 2010

Related U.S. Application Data

(60) Provisional application No. 60/831,677, filed on Jul. 19, 2006.

(30) Foreign Application Priority Data

Jul. 7, 2006   (GB) .................................. 0613586.7

(51) Int. Cl.
*H01M 8/04* (2006.01)
*H01M 2/38* (2006.01)
(Continued)

(52) U.S. Cl.
CPC ... *C25B 1/04* (2013.01); *C25B 9/10* (2013.01); *H01M 8/0232* (2013.01);
(Continued)

(58) Field of Classification Search
USPC ..................... 429/456, 457, 443, 446; 29/457
See application file for complete search history.

(56) References Cited

U.S. PATENT DOCUMENTS 6,455,184 B1   9/2002   Peinecke
6,794,075 B2   9/2004   Steele et al.
(Continued)

FOREIGN PATENT DOCUMENTS

DE   198 53 911   5/2000
EP   1317011      6/2003
(Continued)

OTHER PUBLICATIONS

Leah et al, "Modelling of Cells, stacks and systems based around metal-supported planar IT-SOFC cells with CGO electrolytes operating at 500-600° C.", Journal of Power Sources, 2005, 145, pp. 336-352.
(Continued)

*Primary Examiner* — Patrick Ryan
*Assistant Examiner* — Julian Anthony
(74) *Attorney, Agent, or Firm* — Shapiro, Gabor and Rosenberger, PLLC

(57) ABSTRACT

The present invention discloses a fuel cell, oxygen generator or high temperature electrolyzer comprising a metallic substrate comprising: (i) at least one porous region comprising a plurality of pores in said metallic substrate, where the porosity varies in at least one direction substantially coincident with the path or paths of a reactant stream to be passed over the substrate when in use and/or in areas of in-use poor gas flow; and (ii) at least one non-porous region bounding the at least one porous region, and having mounted on said metallic substrate an electrode of said fuel cell, oxygen generator or high temperature electrolyzer. Also disclosed are fuel cell stack layers and fuel cell stacks comprising same.

42 Claims, 12 Drawing Sheets

(51) Int. Cl.
*H01M 2/40* (2006.01)
*H01M 8/24* (2006.01)
*C25B 1/04* (2006.01)
*C25B 9/10* (2006.01)
*H01M 8/02* (2006.01)
*H01M 8/12* (2006.01)

(52) U.S. Cl.
CPC ......... *H01M 8/0243* (2013.01); *H01M 8/0245* (2013.01); *H01M 8/0247* (2013.01); *H01M 8/04089* (2013.01); *H01M 2008/1293* (2013.01); *Y02E 60/366* (2013.01); *Y02E 60/50* (2013.01); *Y02E 60/523* (2013.01); *Y02E 60/525* (2013.01)

(56) References Cited

U.S. PATENT DOCUMENTS

| | | | |
|---|---|---|---|
| 7,060,384 B2* | 6/2006 | Yoshida et al. | 429/481 |
| 2003/0077501 A1* | 4/2003 | Knights et al. | 429/38 |
| 2003/0134171 A1 | 7/2003 | Sarkar et al. | |
| 2003/0186101 A1 | 10/2003 | Christansen et al. | |
| 2003/0224234 A1 | 12/2003 | Steele et al. | |
| 2003/0235743 A1 | 12/2003 | Haltiner | |
| 2004/0058228 A1 | 3/2004 | Shibata et al. | |
| 2004/0072057 A1 | 4/2004 | Beatty et al. | |
| 2004/0101742 A1* | 5/2004 | Simpkins et al. | 429/44 |
| 2004/0115503 A1 | 6/2004 | Jacobson et al. | |
| 2004/0161659 A1 | 8/2004 | Lloyd et al. | |
| 2005/0014049 A1 | 1/2005 | Hart et al. | |
| 2005/0208367 A1 | 9/2005 | Hoefler | |

FOREIGN PATENT DOCUMENTS

| | | |
|---|---|---|
| EP | 1359635 | 11/2003 |
| EP | 1403954 | 3/2004 |
| EP | 1434294 | 6/2004 |
| GB | 2394114 | 4/2004 |
| GB | 2400723 | 10/2004 |
| GB | 2405028 | 2/2005 |
| JP | 2004-119108 | 4/2004 |
| JP | 2005-093262 | 4/2005 |
| WO | WO 02/35628 | 5/2002 |
| WO | WO 02/089243 | 11/2002 |
| WO | WO 03/007538 | 1/2003 |
| WO | WO 03/073546 | 9/2003 |
| WO | WO 2004/030133 | 4/2004 |
| WO | WO 2004/049484 | 6/2004 |
| WO | WO 2004/059765 | 7/2004 |
| WO | WO 2004/089848 | 10/2004 |
| WO | WO 2004/095605 | 11/2004 |
| WO | WO 2004/109833 | 12/2004 |
| WO | WO 2005/078843 | 8/2005 |

OTHER PUBLICATIONS

Aguiar et al., "Anode-supported intermediate temperature direct internal reforming solid oxide fuel cell. I" model-based steady-state performance", Journal of Power Sources, 2004, 138, pp. 120-136.

Brandon et al., "Development of Metal Supported Solid Oxide Fuel Cells for Operation at 500-600° C.", Journal of Materials Engineering and Performance, Jun. 2004, vol. 13(3), pp. 253-256.

* cited by examiner

METAL SUBSTRATE FOR FUEL CELLS

CROSS-REFERENCE TO RELATED APPLICATION

This application claims the benefit of U.S. provisional patent application No. 60/831,677 filed 19 Jul. 2006.

The present invention relates to a gas permeable metallic substrate for applications in fuel cells, particularly solid oxide fuel cells (SOFC), and in particular the provision of a metallic substrate, which is designed to control the concentration of reactant fuel in the fuel electrode area to minimize the gradients of temperature and current density which normally develop along the path of fuel stream during fuel cell operation, and so produce a more controlled and generally uniform power density along the path of the fuel stream and across the fuel cell.

Recent development of the SOFC based on thick-film gadolinia doped ceria (CGO) electrolyte allows lowering of the operating temperature to below 600° C. where strong, low-cost and ductile metallic materials, such as standard stainless steel, can be used as a substrate to support the electrochemically active cell components. The metallic substrates provide mechanical robustness required for cell fabrication, stack assembly and operation, and also improve thermal shock resistance, reduce temperature gradients in the fuel cell stack due to the greater thermal conductivity of the metal stack layers, enable conventional metal joining and forming techniques to be used in the fuel cell stack production process, and can be fabricated using low-cost manufacturing techniques which lend themselves to mass production.

A fuel cell produces heat and electricity by the interaction of a fuel gas and an oxidant gas via an anode, electrolyte, cathode assembly. Traditionally, the fuel gas contacts the anode electrode and the oxidant gas, normally air, contacts the cathode electrode. In the case of a solid oxide fuel cell, the oxygen ions in the air on the cathode side are stripped out and pass through the electron impermeable electrolyte to combine with hydrogen ions from the fuel gas. This then creates a voltage that can drive a current through a load circuit connected across the anode and cathode side. Heat is generated, not only from the electrochemical action of the fuel cell, but also as a result of the ions flowing through the fuel cell components, which have internal ion flow resistance.

The efficiency of the fuel cell relies on many factors, but the ability to get the correct amount of air and the correct amount and dilution of fuel to their respective cathode and anode sites plays a significant part. If sufficient fuel cannot get to and get away from the anode, then mass transport effects will limit the performance of the fuel cell. In addition, if the fuel becomes too dilute as it passes along the fuel cell, then the highly diluted fuel at the end of this path will result in the anode at his point producing low power, whilst the anode area at the start of the path will produce high power. Thus, in a relatively short space, the fuel cell can have significant current variations, and hence power density variations.

U.S. Pat. No. 6,794,075 (WO 02/35628) discloses a metal-supported SOFC based on CGO electrolyte. It discloses a SOFC whose electrochemically active elements are supported by a stainless steel substrate comprising a porous region and a non-porous region bounding the porous region over which the electrochemical active elements of SOFC are located. In one embodiment of U.S. Pat. No. 6,794,075, the porous region of the stainless steel substrate includes a plurality of through apertures which are uniformly spaced and fluidly interconnecting the one and the other surface of the substrate. In the said embodiment, the through apertures are introduced to the substrate by photo-chemical machining and/or laser machining.

In another embodiment of U.S. Pat. No. 6,794,075, the substrate is composed of a porous sintered metal powder region joined to a non-porous region. Furthermore, US 2003/0224234 discloses a method of forming an impermeable sintered CGO electrolyte layer on a porous stainless steel substrate through fabrication steps which warrant the attainment of sufficiently high densities in the CGO electrolyte film when sintered at temperatures around 1000° C. This capability has made it possible to incorporate ferritic stainless steel substrates in SOFC.

US 2004/0161659 discloses a current collector for use in a fuel cell, the current collector being designed to provide operational hydration for a fuel cell ion exchange membrane. Notably, it is stated at para [0031] that the invention is not suitable for use in solid oxide fuel cells.

Other prior art includes EP1359635A1, EP1317011A2, WO2004/030133A1, WO2004/049484, WO2004/059765A2, WO02/089243A2, US2003/0186101A1, US2004/0115503, US2003/0134171 and US2004/0072057A1, all of which include embodiments to provide a solid oxide fuel cell supported by a porous substrate made of a Fe—Cr based ferritic stainless steel. However, the prior art referred to above fails to provide a description of porosity in the substrates in terms of the shape, size and distribution of openings that provide the porosity.

WO 03/073546 discloses a fuel cell with variable porosity gas distribution layers (distinct from the metallic substrate layer upon which is mounted an electrode), configured such that an essentially uniform gas distribution is provided across the face of the catalyst layers. Gas distribution is, of course, distinct from power distribution. EP1403954 (JP2004119108) discloses the use of first and second layers having different porosity, mounted one on top of the other. JP2005093262 discloses a stress relaxation/removal area as part of a fuel cell design with the aim or reducing thermal cracking and thus failure of the fuel cell. This is achieved by way of three zones having discrete porosity and extending outwards radially from a centre point and comprising (i) a highly porous central zone, (ii) a lower porosity surrounding frame which acts as the stress removal/relaxation area, and (iii) an outer non-porous frame.

Fuel cells, fuel cell stack assemblies and fuel cell stack system assemblies are well known in the art and include the likes of US 2003/0235743; EP 1434294/US 2004/0101742; Leah, R T, Brandon, N P, Aguiar, P, Journal of Power Sources, 2005, 145(2): 336-352; WO 02/35628; WO 03/07538; GB 2394114; WO 2004/089848; GB 2400723; GB 2405028; and WO 2005/078843. The contents of each of the references discussed herein, including the references cited therein, are herein incorporated by reference in their entirety.

A generic problem for fuel cell operation is the deterioration of operational efficiency arising from fuel concentration dilution along the path of gas stream or in reduced gas flow areas. Most solid oxide fuel cells are intended for operations using $H_2$ or a hydrocarbon fuel comprising $H_2$ and CO. When fed into an operating fuel cell, the fuel oxidation produces the electrochemical formation of $H_2O$ and $CO_2$ on the fuel electrode (anode) side. These species form at the three-phase (fuel, anode and electrolyte) boundary and diffuse through the porous anode to the anode channel where they mix with the $H_2$ and CO, thus diluting the fuel stream. This leads to the development of a concentration gradient of the reactant gas along the path of fuel stream, and the concentration gradient is exaggerated in areas of poor gas flow. The variations in concentration of the fuel concentration within the reactant gas volume under the anode directly impacts the concentration of fuel in the respective local anode areas, which in turn produces gradients of both temperature and current density in the fuel cell active area along the same reactant fuel stream path or in reduced gas flow areas. These effects can give rise to considerable reduction in the electrochemical performance efficiency of a fuel cell. Depending on the fuel cell design and the type of fuel used, the temperature fluctuation along the path of gas stream can be as large as ±100° C. of the intended operating temperature over a short distance (such as less than 100 mm of reactant fuel stream path), which can lead to mechanical damage or operational failure of cell components. An example of this behaviour predicted by computational modelling for an anode-supported planar SOFC operating with direct internal reforming of a hydrocarbon fuel is disclosed in Reference [1].

Extensive fuel cell development work has been carried out at the assignee of the present invention to reduce the thermal gradients in fuel cells and fuel cell stacks, the results of which have been disclosed partially in Reference [2]. This work was complemented by a computer model which was developed to predict the fuel dilution and the resulting temperature and current density gradients along the path of gas stream. The model considers a fuel cell stack comprising several electrochemical cells, repeated between two interconnecting plates located above and below the cell positive-electrolyte-negative (PEN) structure. FIG. 1 shows a schematic side view of a co-flow SOFC stack, where the unit cell being modelled is indicated as 100. The PEN structure is shown as 20, and fuel and air flow as 30 and 40 respectively. The fuel cell studied in the model comprises a stainless steel substrate, a 10 mol % $Gd_2O_3$ doped $CeO_2$ (CGO) electrolyte, Ni—CGO anode and a lanthanum-strontium-cobalt-iron-oxide based cathode (LSCF).

Examples of the results from the model simulations based on a 2.5 kWe SOFC stack operating at essentially 600° C. on a completely externally reformed hydrocarbon fuel with co-flow of the fuel and air streams have been presented here in order to reveal the interrelation between the fuel dilution and both temperature and current density gradients along the path of the gas stream. The model consists of mass balances around the fuel and air channels, energy balances around the fuel and air channels, PEN, and interconnect, and the electrochemical model that relates the fuel and air gas compositions and the various cell temperatures to voltage, current density, and other cell variables, all of which are calculated for 70% fuel utilization.

FIG. 2 shows the predicted concentration profiles for methane, steam, $H_2$, CO and $CO_2$ along the length of the fuel channel in the direction of gas flow. The concentration of $H_2$ being 51.5% at the fuel channel inlet is diluted to about 15% due to the electrochemical reactions in the cells producing steam and $CO_2$ as the gas stream travels through the cell regions to the outlet. FIGS. 3 and 4 show the predicted profiles of temperature and current density along the same axis, respectively. In FIG. 4 the current density is detailed to reveal the profiles of external current density, electronic leakage current density and total ionic current density in the electrolyte, separately.

The distribution of current density seen in FIG. 4 is as a result of the variation in temperature and hydrogen partial pressure along the direction of flow. The cells are assumed to be at a constant potential because of the high conductivity of the anode and substrate. The variations in cell area specific resistance (ASR) as a function of temperature and hydrogen partial pressure therefore manifest themselves as a spatial variation in current density. The predicted external current density initially rises along the direction of fuel flow, as a result of increasing temperature, before falling off again as the depletion of the effective hydrogen in the fuel towards the exit becomes dominant over the temperature. The electronic leakage current density is negligibly small in fuel stream regions where the temperature remains below 600° C. and increases along the direction of fuel flow with increasing temperature. This is partly because the electronic leak is a function of both temperature and oxygen partial pressure on the fuel side.

The temperature profile shown in FIG. 3 is as a result of the heat generation within the cells resulting from the electrochemical interaction and the current flow through the internal resistance of the cells. The model predicts a temperature rise of 130° C. across the stack for the air stream, as shown in FIG. 3. The heat generated during operation is dissipated through the fuel cell layers and by transfer to the gas streams, particularly the air stream. In normal fuel cell operation, the amount of airflow on the cathode side will be significantly greater than the fuel flow on the anode side. The relatively slow flow of the fuel stream and the relatively good heat transfer that occurs to the fuel stream means that the fuel gas rapidly heats to the approximate temperature of the metal components at the entry to the fuel channel. However, because the air flows at a much faster rate than the fuel, and has poorer heat transfer characteristics than the fuel, a larger temperature difference exists between the air and the fuel cell components surrounding the air flow.

In conclusion, there is a need to adjust the concentration of the reactant gas delivered to the anode area locally along the path of gas stream so that the variations in current density and temperature along the same path are controlled and minimized.

It is thus an aim of the present invention to overcome the prior art disadvantages and to provide an improved metallic substrate and a method of manufacturing the same.

SUMMARY OF THE INVENTION

According to the present invention there is provided a fuel cell, oxygen generator or high temperature electrolyser comprising a metallic substrate comprising:
(i) at least one porous region comprising a plurality of pores in said metallic substrate, where the porosity varies in at least one direction substantially coincident with the path or paths of a reactant stream to be passed over the substrate when in use and/or in areas of in-use poor gas flow; and
(ii) at least one non-porous region bounding the at least one porous region, and having mounted on said metallic substrate an electrode of said fuel cell, oxygen generator or high temperature electrolyser.

Preferably, the fuel cell, oxygen generator or high temperature electrolyser comprises a solid oxide fuel cell (SOFC), more preferably an intermediate-temperature solid oxide fuel cell (IT-SOFC). Preferably, the IT-SOFC has an operational temperature in the range 400-650° C., more preferably 450-650° C.

Poor gas flow is defined as a reduced gas flow rate occurring in a region where the flow of gas adjacent to, and in planar relation to, the electrode layer in the region of the fuel cell is less than that of the mean or median flow rate over the whole fuel cell, where the reduced gas flow rate arises from the flow direction being significantly altered (e.g. >30° from the main flow direction), and/or is an occurrence of the flow rate being significantly reduced (e.g. <50%) in comparison to the mean or median flow rate over the whole fuel cell. Poor gas flow includes the occurrence in a region of the stopping of gas flow.

The term "pore" means porous apertures, and with the metallic substrate defining first and second opposite surfaces, pores are defined extending from one surface to the other. Beyond that, no restrictions are implied upon their shape or dimensions.

The metallic substrate provides mechanical support to the fuel cell and the variation of the porosity of the porous region enables control of the reactant gas flow from the gas stream to the electrode layer.

The present invention seeks to overcome the prior art disadvantages by providing the metallic substrate with an appropriate porosity variation arranged along the path of reactant gas stream and/or where there is poor gas flow. The present invention also seeks to provide substrate with adequate porosity in its porous regions to allow desired levels of fuel flow to the electrode regions in order to provide a more controlled and generally uniform current density in the anode structure and therefore power density across the fuel cell. In particular, the present invention seeks to provide a porous substrate having the capability to mechanically support fuel cells when arranged in stacks.

Further, it is preferable to manufacture the substrates through processes which lend themselves to precise control, cost-effectiveness and mass production.

The porosity of the at least one porous region may increase or decrease in one or more directions substantially coincident with the paths or a fuel reactant stream and/or where there is poor gas flow. Thus, in some embodiments of the present invention, fuel gas flow is along a generally linear flow path from a fuel inlet to a fuel outlet, and the porosity of the substrate at the fuel inlet is lower than that at the fuel outlet, thus providing for a more uniform power density generation across the fuel cell than would be achieved if e.g. the substrate porosity along the whole length of the flow path were uniformly high.

The variation of the porosity can be used to control the effective concentration of fuel gas reacting with the local anode electrode area to produce a more controlled and generally uniform current density along the reactant gas stream path, and thus producing a more controlled and generally uniform power density across the fuel cell in the line of the reactant gas stream path. This more controlled and generally uniform power density can also reduce the risk of developing hot-spots or hot regions in the fuel cell active area arising from non-homogeneous power density development. In the present invention, these points are addressed by providing a more controlled and generally uniform rate of fuel reduction throughout the active region of the fuel cell, in the flow path of the reactant gas stream.

The porosity variation along the reactant gas stream path is linear or non-linear (for example as a function of distance to an inlet or to an outlet, or as a function of distance from an axis defined between a fuel inlet and a fuel outlet), such that the resulting fuel cell power density is more controlled and generally uniform throughout the cell area. The porosity variation can be achieved by varying the pore size, the aperture-to-aperture spacing (the aperture or porosity density), or a mixture of both.

Preferably, a porosity gradient is defined along the reactant gas stream path.

In other embodiments, the pores are also not confined to being constant in size through the depth of the substrate, and are of varying size through the metallic substrate.

In certain embodiments, the porosity of the porous regions is varied other than in the direction of the reactant flow. In particular, the hole size and hole distribution can be selected to counteract a poor gas flow, for example in a specific region of a substrate. For example, if the gas flow along the edges of a fuel cell is poorer than in the central region, the equivalent edge region can be made more porous. In this case, the variation in porosity is not coincident with the reactant stream flow. In another embodiment, a rectangular form planar fuel cell with a gas inlet on one side and a gas inlet on an opposing side suffers from poor or reduced gas flow in the corner regions of the fuel cell. This results in poor fuel distribution and hence fuel concentration gradients in the anode local to these regions. To overcome this effect, the porosity is increased in the corresponding areas to improve the fuel distribution in the anode. FIG. 7A shows porosity varying not only along the reactant gas stream path, but also at the edges and in the corners of the fuel cell.

Preferably, the pores are partially filled with a porous filling material, or are fully filled, or they can be either partially or fully filled with the porous filling material extending above the surface of the metallic substrate to form a porous layer.

In certain embodiments, the porous layer is a layer over which fuel cell layers may be provided; in others it is an electrode itself. Preferably, it is an anode layer. The porous layer preferably is electrically conductive. The material used to fill the pores is preferably also a catalyst for internal reforming of the fuel within the fuel cell stack. The pores are preferably either filled fully or coated, or partially filled or coated with the catalyst material or a composite material comprising the catalyst and one or more of the filling material.

The pore filling with the materials can be achieved by one or a combination of wet deposition methods, including tape casting, slurry casting, stencil printing of a paste, ink filling, and screen printing.

In one embodiment, the substrate comprises a sheet of ferritic stainless steel containing from about 15 to 24 wt. % Cr and one or more of other alloying additives. Preferable alloying additives include Mn, Ti, Nb, Si, Ni, Al, Zr and La. Preferably, the substrate has a thickness of from about 100 to 1000 µm.

The porous region of the substrate includes a plurality of pores (through apertures). The pores may have a fixed lateral dimension ranging from 5 to 500 µm and a spacing varied along the paths of fuel stream in the range from 50 to 1000 µm. More preferably, the pores have a fixed lateral dimension of from 10 to 200 µm and a lateral spacing varied along the paths of fuel stream in the range from 100 µm to 500 µm. Yet more preferably, the pores have a lateral dimension of 30 µm and a variation of lateral spacing from 200 to 300 µm. The pores are not limited to being circular in shape, and other preferred shapes are non-circular, elliptical and square.

In other embodiments, the pores are provided with alternative cross-sectional shapes. Furthermore, the pores are arranged in any desired pattern or are not in a pattern at all, and are configured to provide a desired porosity at a desired point in the substrate. Porosity can be measured over a suitable unit area. For example, in some embodiments a suitable unit area for defining porosity is 1, 2, 3, 4 or 5% of the area of the substrate. In other embodiments, particularly those which define a generally linear flow path from an inlet to an outlet, porosity can be measured at a tangent (preferably, perpendicular) to an axis defined between the inlet and the outlet.

Thus, the porosity is preferably varied by the pore density, pore size or both varying in one or more directions substantially coincident with the path or paths of a reactant gas stream. The porosity is preferably controlled according to the type of fuel gas used, the flow path and flow rates of the fuel reactant gas, the concentration of the reactant fuel gas in an area, the porosity and permeability of the electrode adjacent to the porous region, and/or the thickness of the metal substrate. For example, in an area of the fuel cell substrate with a low fuel concentration reactant gas supply, the substrate porosity can be increased to compensate and allow a greater volume of fuel gas to access the anode, when compared to that for, say, an area of the fuel cell with high fuel concentration reactant gas supply where the porosity might be reduced to reduce the volume of fuel gas accessing the anode. Likewise, a highly porous and permeable electrode can have a substrate with less porosity than a less porous and less permeable electrode, and a less porous and permeable electrode can have a more porous substrate that a more porous and permeable electrode. Thus, it is an advantage of this invention that for an electrode where the porosity and/or permeability varies across the electrode, that the porosity of the metal substrate can be varied to compensate for the varying electrode porosity and also the varying fuel concentration and varying fuel supply rates to particular areas of the fuel cell anode, and thus produce a fuel cell that operates with a more uniform fuel cell current density.

Preferably, the pores provide an open area of from 1 to 65% of the total surface area of the porous region of the substrate. More preferably, the pores provide an open area of from 10 to 50% of the total surface area of the porous region of the substrate. More preferably still, the open area of the pores is 40% of the total surface area of the porous region of the substrate.

Preferably the pores are distributed in a distorted hexagon pattern for the conditions where the lateral dimension of the pores is kept at a constant value and the lateral spacing of pores is varied along the paths of fuel stream or both parameters are varied along the same paths.

Preferably the pores are distributed in a regular hexagon pattern for the conditions where the lateral spacing of the pores is kept at a constant value and the lateral dimension of the pores is varied along the path of fuel stream.

Preferably, the pores are introduced to the substrate by photo-chemical machining, laser machining, or hole punching, or a combination of these processes in succession. The pores can be introduced from one side or from both sides of the substrate. In addition, a pore from one side might link with more than one pore from the other side.

In another embodiment, the pores described in the said embodiments are filled partially to produce a flat surface on one face of the substrate where an anode layer is located.

A flat or continuous smooth surface enables electrochemically active components to be conveniently provided on the substrate, which is especially useful when relatively large pores are used. Large pores are defined in terms of a ratio of the substrate thickness e.g. 0.1 to 2.0× the substrate thickness. Thus, for a substrate of 200 micron thickness, a preferable pore diameter is 20-400 microns. If such a filling were not used, then covering such pores with electrochemically active ceramic materials would normally result in the ceramic sagging across the pore, thus producing a non-flat surface which can subsequently lead to failure of the ceramic layers of the fuel cell due to the development of stress gradients arising from the fabrication process and during fuel cell operation.

Any suitable porous filling material may be used, an example of which is $CeO_2$ alloyed with 10-20 mol % $Gd_2O_3$ (CGO), the thermal expansion coefficient of which is a good match to ferritic stainless steel. The thermal expansion coefficient of CGO materials can be tailored further to enhance the thermal expansion coefficient matching by blending CGO with a material having a higher thermal expansion coefficient, such as NiO, or a material having a lower thermal expansion coefficient, such as $TiO_2$ and/or $Y_2O_3$ stabilised $ZrO_2$ (YSZ).

Alternatively, 8 mol % $Y_2O_3$ stabilised $ZrO_2$ containing 10-60 volume % NiO can be used to fill the pores. The addition of NiO to the filling material is advantageous because of the porosity enhancement achieved by the reduction of NiO grains to Ni under exposure to reducing gasses during fuel cell operation.

In another embodiment, the pores have a fixed lateral spacing of from 50 to 1000 μm and a lateral dimension varied along the paths of fuel stream from about 5 to 1000 μm. Preferably, the pores have a fixed lateral spacing of from 10 to 500 μm and a lateral dimension varied along the paths of fuel stream in the range from 10 μm to 500 μm. More preferably, the pores have a lateral spacing of 200 μm and a dimensional variation from 20 to 100 μm.

In another embodiment, both lateral dimension and spacing of the pores are varied along the path of fuel stream within the ranges prescribed in the said embodiments.

In one embodiment, one or more of the pores described in the said embodiments could be partially or fully filled with a porous material to provide a continuous surface on at least one face of the substrate. The porous material could be a sintered powder. Preferably, the pores are partially or fully filled with the same material to provide a continuous surface on the side of the substrate where the electrode, such as an anode layer of the fuel cell is located. Preferably, the porous sintered material located in the pores is extended on one surface of the substrate to form a porous layer between the substrate and the electrode of the fuel cell. Preferably, the porous sintered powder material could have a relative porosity of from about 30 to 60%.

Preferably, the porous sintered powder material located in the pores and/or in the porous layer comprises the ferritic stainless steel defined as the substrate material in the embodiments above.

Preferably, the porous sintered powder material comprises a mixed powder of Ni and $Ce_{1-x}Gd_xO_{2-x/2}$ (CGO) where $0.08<x<0.25$ with a volumetric fraction of Ni ranging from 0.30 to 0.75. More preferably, the Ni—CGO mixture contains one or more of the additives, including $Zr_{1-x}YO_{2-x/2}$ (YSZ) where $0.03<x<0.10$, $La_2O_3$, $Cr_2O_3$, Cu, Pt, Pd, Mn and Ru, which are not to exceed 40 volume % of the total powder volume.

In other embodiments, the porous region of the substrate is made of a porous sintered metal powder, having a porosity variation along the paths of fuel stream from about 20 to 60 volume % of the substrate and a thickness which would typically be in the range from 200 to 1000 μm. Preferably, the sintered metal powder could have a porosity variation from about 30 to 50% and a thickness of 400 μm.

In other embodiments, the pores are filled or lined with catalytic material that allows for full or partial conversion of the fuel gas stream.

In another embodiment the metallic substrate may comprise a plurality of the porous regions described above.

According to a second aspect of the present invention, there is provided a fuel cell stack layer including a fuel cell according to the present invention.

According to a third aspect of the present invention, there is provided a fuel cell stack comprising a plurality of fuel cell stack layers according to the present invention and an end plate at each end.

Embodiments of the present invention will now be described, by way of example only, with reference to the accompanying drawings, in which.

Figure 16:
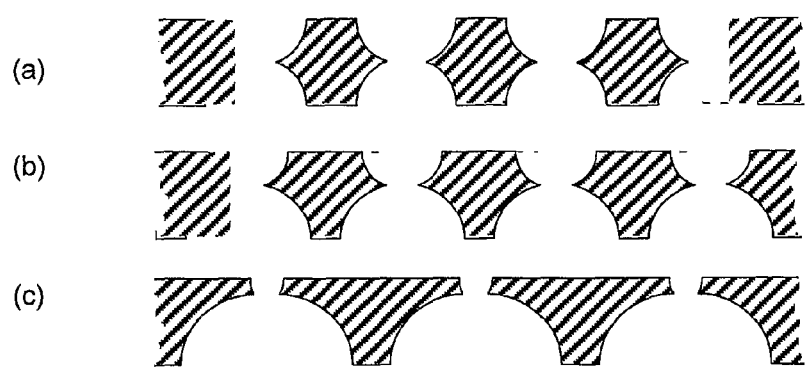
FIG. 16 shows hole/aperture geometries produced by photo-chemical etching of a ferritic stainless steel substrate— (a) shows a symmetric hole arrangement, (b) shows a mildly non-symmetric hole arrangement, and (c) shows a highly non-symmetric hole arrangement.
Figure 17:
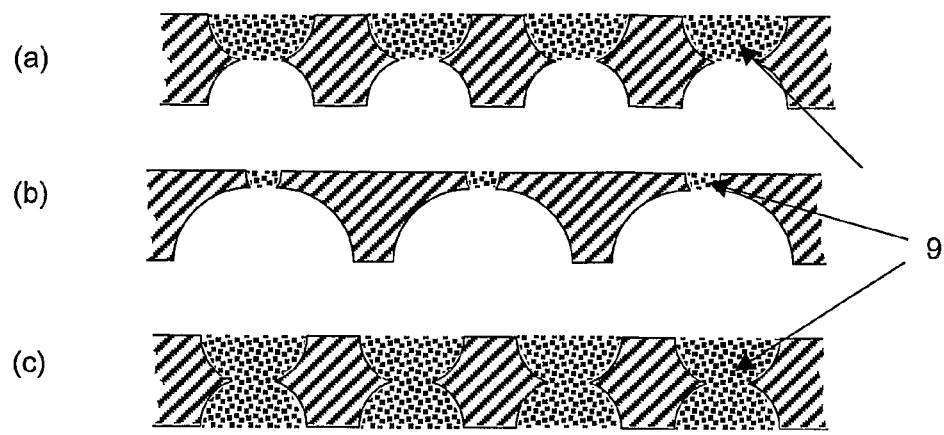
Figure 18:
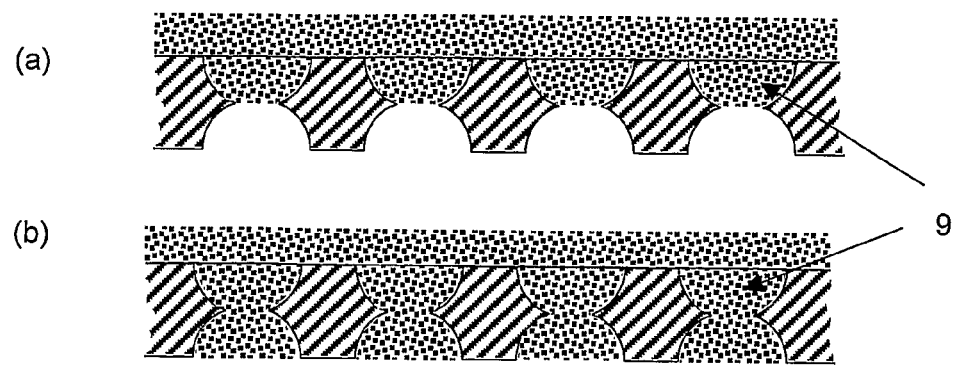

FIG. 17 shows cross-sections of the ferritic stainless steel substrate of FIG. 16 where the apertures are (a) partially filled, (b) partially filled, and (c) fully filled with a porous filling material; and FIG. 18 shows cross-sections of the ferritic stainless steel substrate of FIG. 16 where the apertures are (a) partially filled, and (b) fully filled, with a porous filling material which also extends to cover an in-use upper surface of the ferritic stainless steel substrate.

Figure 5:
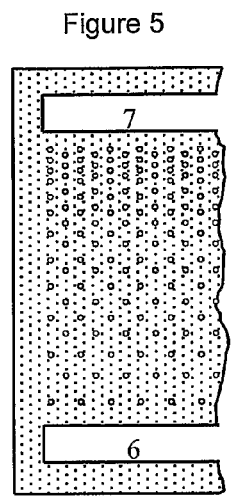
FIG. 5 is a schematic planar partial view of a metallic substrate with a porous region having through pores with a density variation arranged along the path of fuel flow in accordance with a preferred embodiment of the present invention, with reference numerals the same as for FIG. 6.

FIG. 5 shows a metallic substrate 1 for a fuel cell. The metallic substrate 1 has a non-porous region 2 around the periphery of a porous region 3. The porous region is provided in this embodiment by a plurality of pores 4. The direction of flow of a reactant, in this example fuel gas, across the porous region 3 of the substrate 1 is shown by arrow 5 between a fuel gas inlet region 6 and a fuel gas outlet 7. In the embodiment of FIG. 5, the porosity variation in the direction of arrow 5 substantially coincident with the path of the fuel stream is provided by varying the density of the pores.

Figure 1:
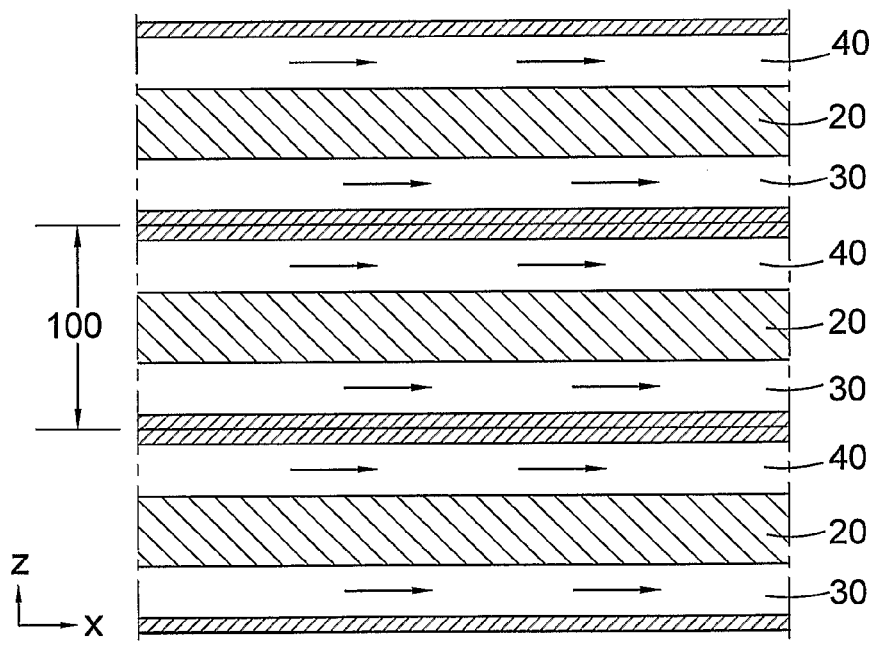
FIG. 1 shows a schematic side view of a co-planar SOFC stack showing the unit cell.
Figure 2:
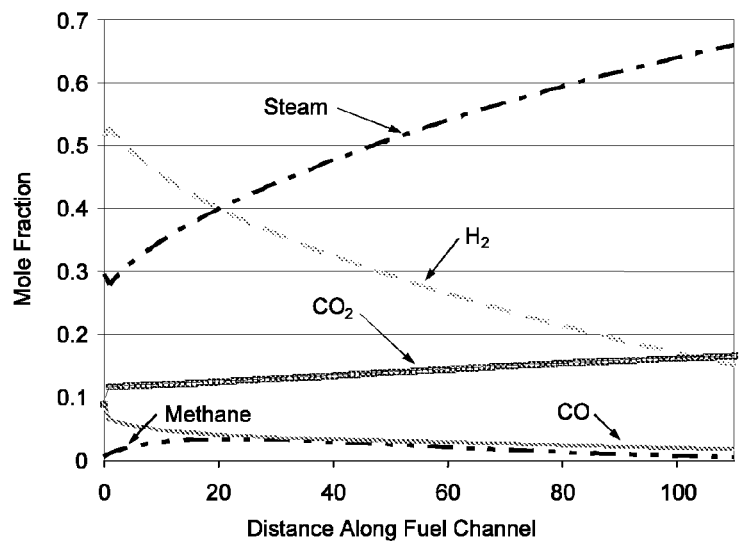
FIG. 2 shows predicted concentration profiles for methane, steam, $H_2$, CO and $CO_2$ along the length of a fuel cell channel in the direction of gas flow.
Figure 3:
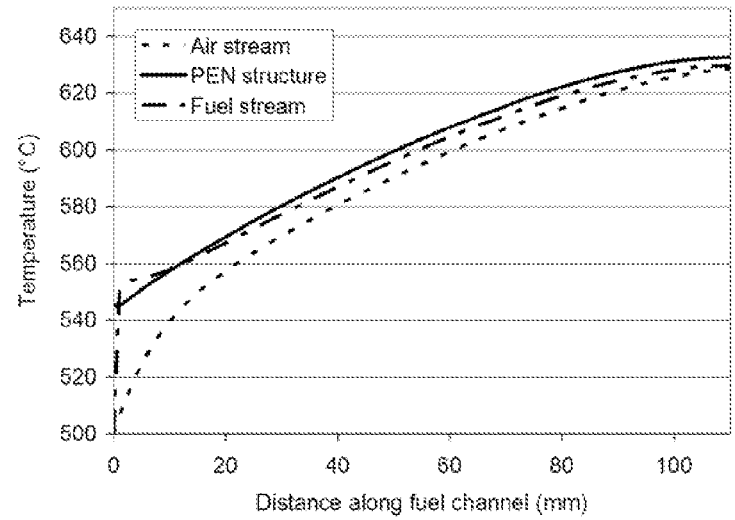
FIG. 3 shows predicted temperature profiles of an air stream, fuel stream and PEN structure of a co-flow planar IT-SOFC stack along the direction of fuel flow.
Figure 4:
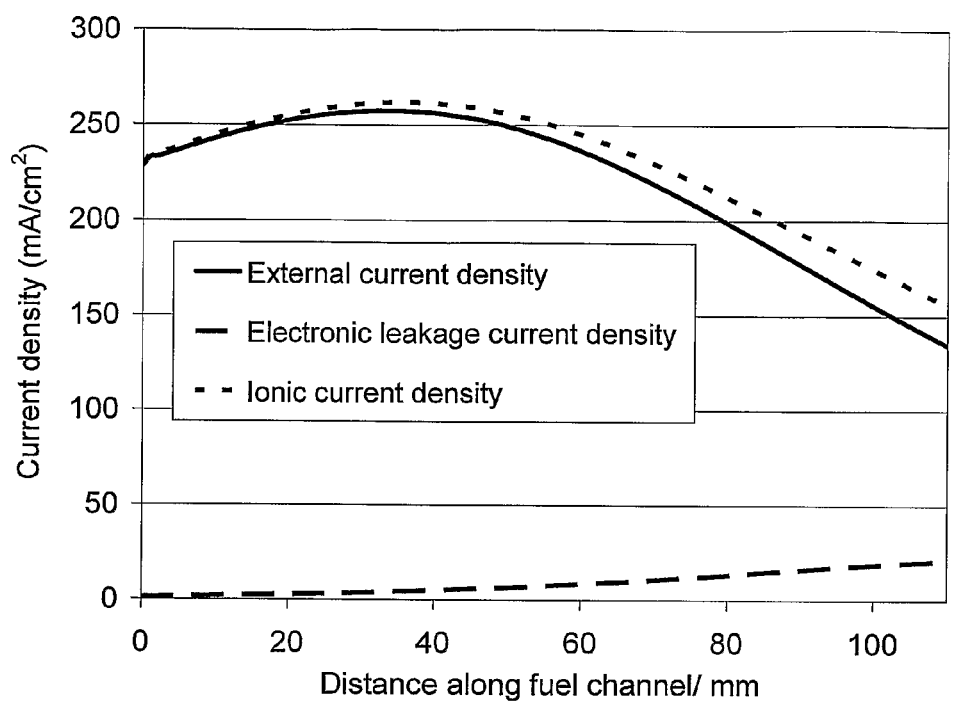
FIG. 4 shows predicted external, ionic and electrode leakage current densities of a co-flow planer IT-SOFC stack along the direction of fuel flow.
Figure 6:
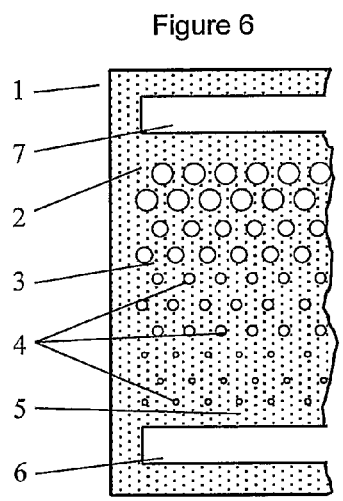
FIG. 6 is a schematic planar partial view of a metallic substrate with a porous region having through pores with a size variation arranged along the path of fuel flow in accordance with a preferred embodiment of the present invention.

The embodiment of FIG. 6 is similar to that of FIG. 5 except that in this embodiment, the porosity variation in the direction substantially coincident with the path of the fuel stream is provided by varying the size of the pores. The embodiment of FIG. 7 is similar to that of FIGS. 5 and 6 except that in this case, the porosity variation in the direction substantially coincident with the path of the fuel stream is provided by varying both the density and size of the pores.

Figure 7:
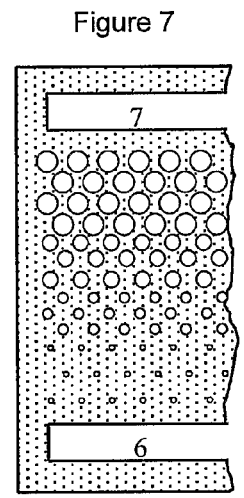
FIG. 7 is a schematic planar partial view of a metallic substrate with a porous region having through pores with size and density variation arranged along the path of fuel flow in accordance with a preferred embodiment of the present invention, with reference numerals the same as for FIG. 6.
Figure 7A:
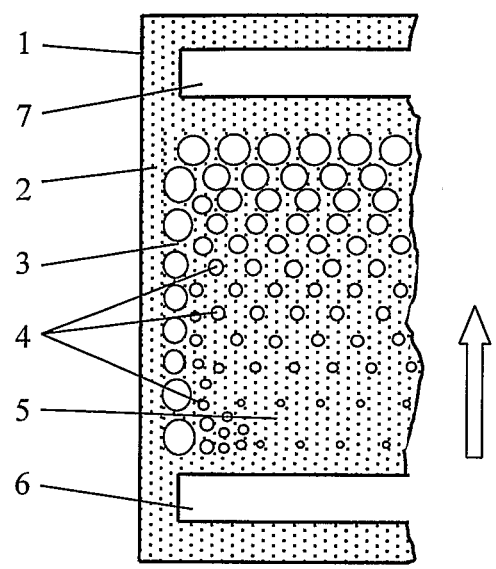
FIG. 7A is a schematic planar partial view of a metallic substrate with a porous region having through pores with size and density variation arranged both (i) along the path of fuel flow and (ii) according to poor gas flow, in accordance with a preferred embodiment of the present invention.
Figure 8:
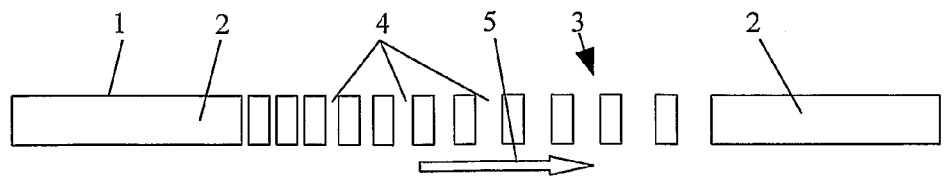
FIG. 8 is a schematic cross section view of a metallic substrate illustrated in FIGS. 5 to 7.
Figure 9:
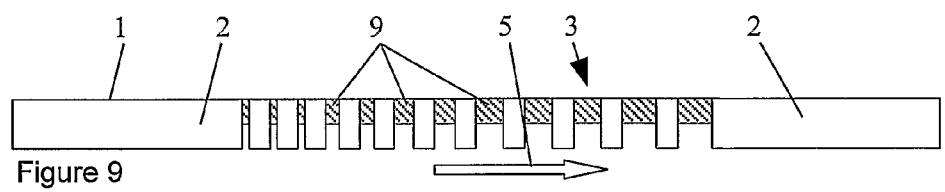
FIG. 9 illustrates the pores partially filled with a sintered porous powder material on the substrate presented in FIG. 8.
Figure 10:
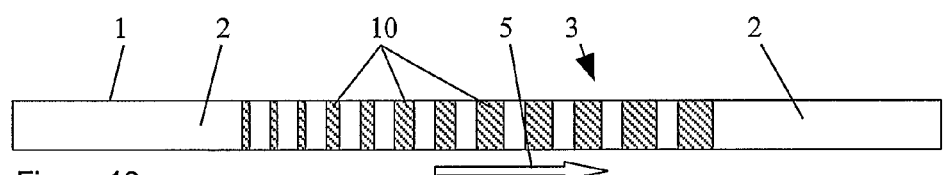
FIG. 10 illustrates the pores fully filled with a sintered porous powder material on the substrate presented in FIG. 8.
Figure 11:
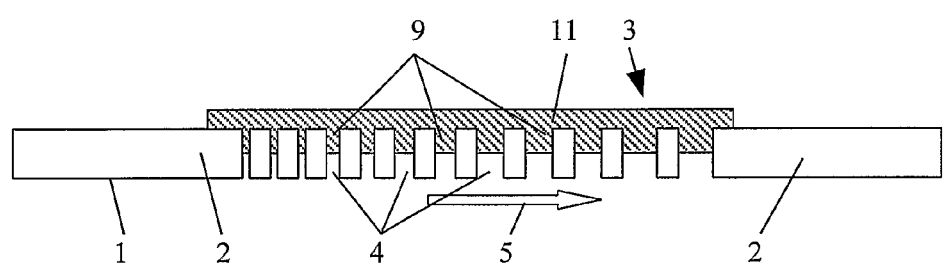
FIG. 11 illustrates the extension of the porous sintered material located in the pores (FIG. 9) on one surface of the substrate to form a porous layer between the substrate and the anode layer of the fuel cell.

In the examples of FIGS. 5, 6 and 7, the pores 4 are provided as cylindrically shaped through holes arranged in a hexagonal pattern. The pores 4 are provided having suitable diameters, in the present embodiment this being in the range from 10 to 50 microns.

FIGS. 8 to 12 show cross-sectional side views of the metallic substrate 1 of FIG. 6 in which the size of the pores 4 increases in the direction of reactant flow 5. In the examples of FIGS. 9 to 12 the pores are provided with a porous filling material 9, 10 to provide a continuous smooth surface on at least one face of the substrate 1. A continuous smooth surface enables electrochemically active components to be provided on the substrate 1 easily, which is especially useful when relatively large pores 4 are used. If such a filling were not used, then covering such large pores with ceramic materials would normally result in the ceramic sagging across the pore, thus producing a non-flat surface which can subsequently lead to failure of the ceramic layers of the fuel cell due to the development of stress gradients arising from the fabrication process and during fuel cell operation. In this embodiment, the metallic substrate 1 is fabricated from ferritic stainless steel, and porous filling material 9,10 is $CeO_2$ alloyed with 10-20 mol % $Gd_2O_3$ (CGO), the thermal expansion coefficient of which is a good match to ferritic stainless steel.

Figure 12:
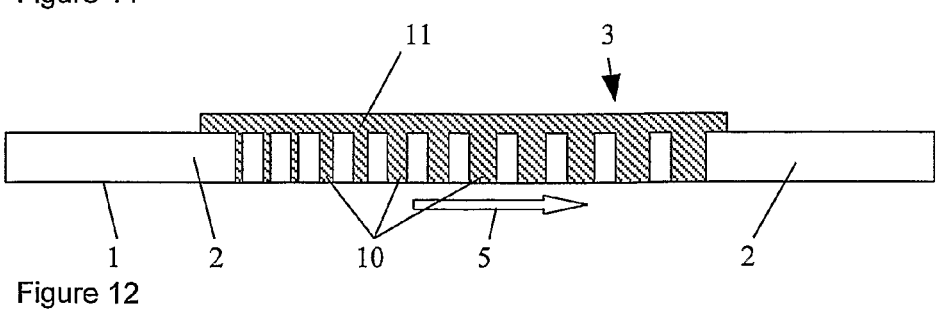
FIG. 12 illustrates the extension of the porous sintered material located in the pores (FIG. 10) on one surface of the substrate to form a porous layer between the substrate and the anode layer of the fuel cell.

In certain embodiments, the pores are partially filled with a porous filling material 9 (FIG. 9), are fully filled (FIG. 10), or the porous filling material can extend above the surface of the metallic substrate 1 to form a porous layer 11 whilst partially filling the pores (FIG. 11) or whilst fully filling the pores (FIG. 12).

Figure 12A:
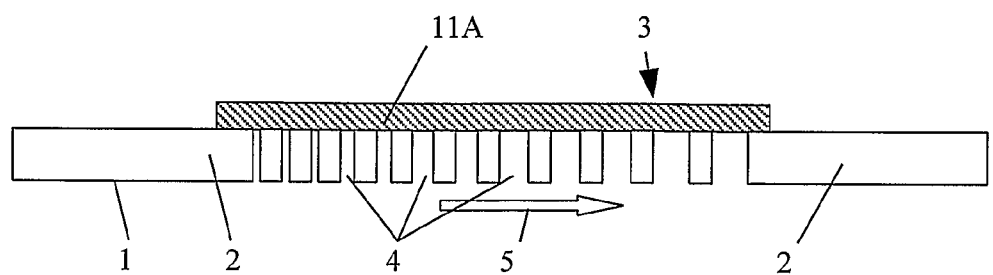
FIG. 12A illustrates a further embodiment in which the porous sintered material is located on and extends across the anode surface of the substrate.

In an alternative embodiment (FIG. 12A), the porous layer is provided in the form of a surface porous layer 11A. it is noted that as detailed above, dependent upon the pore size and physical/chemical properties of the porous layer 11A, it may be prone to sagging into pores 4.

Figure 13:
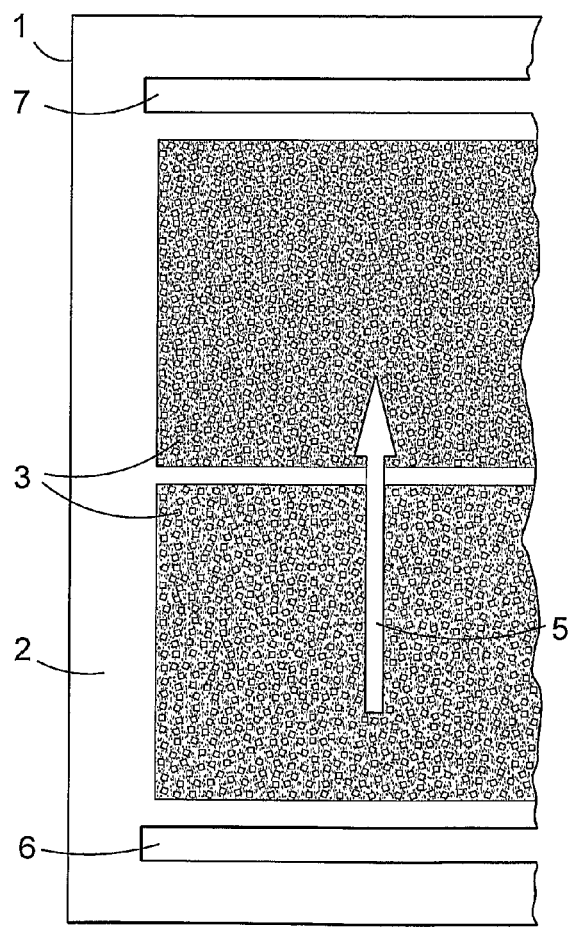
FIG. 13 is a schematic planar partial view of a metallic substrate comprising a plurality of porous regions surrounded by a non-porous region.

In an alternative embodiment shown in FIG. 13, a metallic substrate 1 is provided with a plurality of porous regions 3, allowing for more than one fuel cell to be located on each substrate layer 1. As in the previous examples, the porosity of the porous regions 3 is varied in the direction of reactant flow 5.

Figure 14:
FIG. 14 is a schematic showing the distribution of pores from the cross-section of a 300 µm thick steel substrate whose planar view is presented in FIG. 15.
Figure 15:
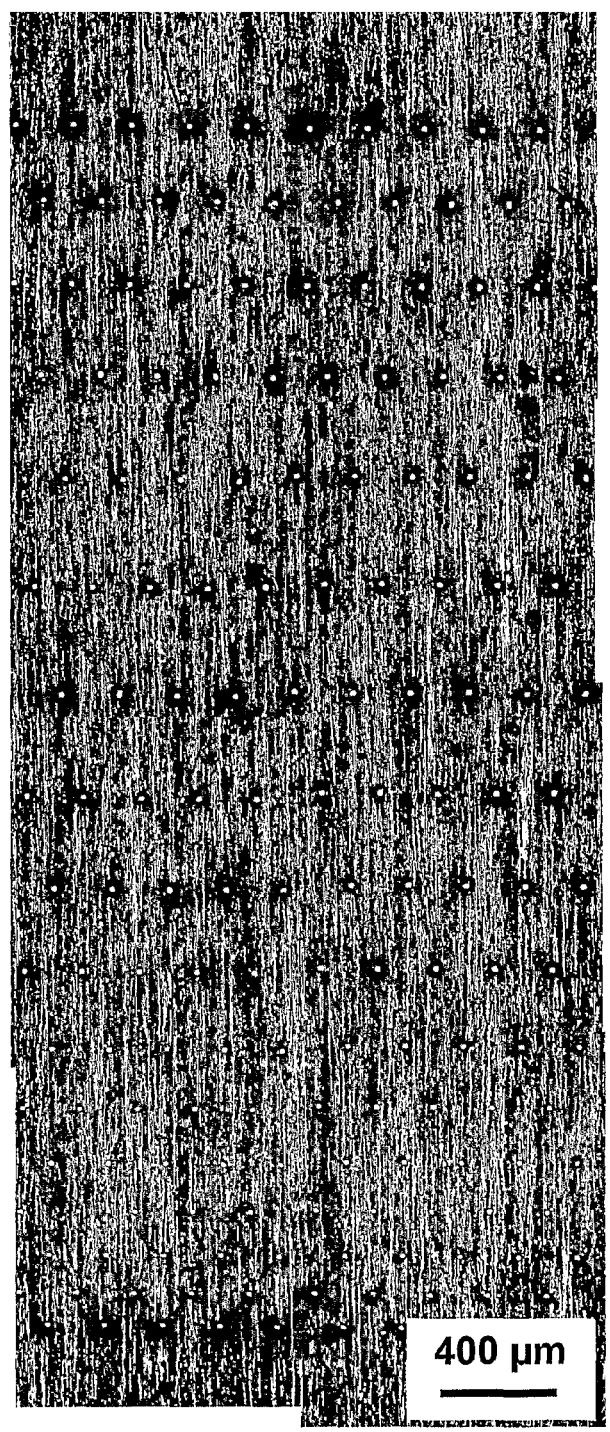
FIG. 15 is an optical image showing planar view of a 300 µm thick steel substrate shown schematically in FIG. 14. The image reveals the configuration of through pores with varying lateral spacing and a lateral dimension of 20 µm.

FIG. 14 shows an optical image of a cross-section through a substrate illustrating the present invention. In the image, 20

μm wide pores have varying lateral spacing. FIG. 15 shows a top view of the substrate shown in FIG. 14.

The metallic substrate described above can also be used in an oxygen generator. When a voltage is applied across the oxygen generator, oxygen is stripped out from the air side gas stream and pumped across the oxygen generator membrane/electrolyte to create a high concentration or pure oxygen gas on the non-air side.

The metallic substrate described above can also be used in a high temperature electrolyser, in which a voltage is applied to the fuel cell allowing oxygen ions to be stripped from steam on one side to the other side, thus creating a hydrogen rich gas stream on one side and an oxygen rich gas stream on the other side.

FIG. 16 shows various aperture shapes used in embodiments of the present invention, created by photo-chemical machining. Thus, not only can apertures be of a generally fixed dimension (e.g. with a fixed diameter for generally circular apertures, or with a fixed width in a plane generally perpendicular with an in-use outer surface of the substrate in the case of other shapes), but their dimensions can also vary. FIG. 16 shows shapes which have resulted from photo-chemical machining performed from both sides of the substrate. However, it is also possible to generate shapes varying in dimension by effecting machining from just one side of the substrate. Other machining techniques can of course be used in other embodiments of the present invention.

FIG. 17 shows porous filling materials (above) partially and fully filling the apertures of FIG. 16. Filling has taken place by way of screen printing an ink into the apertures on one side only (FIGS. 17a and b) and onto both sides (FIG. 17c). In the case of FIG. 17b, the convenient filling of non-symmetric apertures is achieved by tape casting and pressing onto one side of the substrate into the larger aperture to give a controlled fill which does not protrude into the smaller aperture. Subsequently, screen-printing or slurry casting is used on the other side of the substrate into the smaller aperture so as to fill the smaller aperture. After drying of the small pore filler, the whole substrate is processed in a sintering furnace in which the sacrificial filler in the large aperture is removed prior to the final sintering of the small aperture filler.

Thus, chosen filling materials are used, including in certain embodiments catalysts, particularly for the reforming of fuel. In the embodiments shown, the porous filling material is deposited so as to provide a continuous surface to the porous region of the substrate such that an electrode can be readily deposited upon it. In certain embodiments, a fuel cell anode is deposited upon the continuous surface.

FIG. 18 shows further embodiments in which the porous filling material extends onto an in-use outer surface (in this case, an upper surface) of the substrate, again to produce a continuous surface upon which an electrode can be subsequently deposited or otherwise attached.

Many variations may be made to the examples described above whilst still falling within the scope of the present invention. For example, the porosity of the porous region may be varied by any desirable means such as varying the density, size or shape of pores or a mixture of such methods. The metallic substrate may be used with any type of fuel cell such as solid oxide fuel cell (SOFC), proton exchange membrane (PEM) fuel cells and direct methanol fuel cells (DMFC) or an oxygen generator. Either the anode or cathode of a fuel cell may be provided over the metallic substrate. The metal substrate is preferably provided as part of a fuel cell or fuel cell stack layer. A plurality of fuel cell stack layers may be provided as a fuel cell stack with an end plate at each end.

REFERENCE NUMERALS

1—metallic substrate
2—non-porous region
3—porous region
4—pore
5—direction of reactant flow
6—fuel gas inlet region
7—fuel gas outlet
9—porous filling material
11—porous layer
11A—surface porous layer
20—cell positive-electrolyte-negative (PEN) structure
30—fuel flow
40—air flow
100—unit cell

REFERENCES

Reference [1]. P. Aguiar, C. S. Adjiman and N. P. Brandon, "Anode supported intermediate temperature direct internal reforming solid oxide fuel cells. I: model-based steady state performance, J. Power Sources, 138 (2004) 120-136.

Reference [2]. N. P. Brandon, D. Corcoran, D. Cummins, A. Duckett, K. El-Khoury, D. Haigh, R. Leah, G. Lewis, N. Maynard, T. McColm, R. Trezona, A. Selcuk, and M. Schmidt, "Development of Metal Supported Solid Oxide Fuel Cells for Operation at 500-600° C.", Journal of Materials Engineering and Performance Vol. 13(3) (2004) 253-256.

The invention claimed is:

1. A fuel cell comprising a metallic substrate comprising:
   (i) at least one porous region comprising a plurality of pores in said metallic substrate, where the porosity varies in at least one direction substantially coincident with the generally linear path or paths of a rectangular form reactant stream to be passed over the substrate when in use and/or in areas of in-use poor gas flow; and
   (ii) at least one non-porous region bounding the at least one porous region, and having mounted on said metallic substrate an electrode of said fuel cell, and
   wherein the porosity varies by the size or density of the pores varying in one or more directions substantially coincident with the in-use path or paths of a reactant stream.

2. A fuel cell according to claim 1, wherein the porosity increases in the one or more directions substantially coincident with the in-use path or paths of a reactant stream.

3. A fuel cell according to claim 1, wherein the porosity decreases in the one or more directions substantially coincident with the in-use path or paths of a reactant stream.

4. A fuel cell according to claim 1, wherein the porosity varies as a function of distance to an inlet or to an outlet of said fuel cell.

5. A fuel cell according to claim 1, wherein said porosity varies as a function of distance from an axis defined between a fuel inlet and a fuel outlet of said fuel cell.

6. A fuel cell according to claim 1, wherein said pores have a fixed lateral dimension of about 5-500 μm.

7. A fuel cell according to claim 1, wherein said plurality of pores has a lateral dimension varied along the in-use path or paths of a reactant stream of about 5-1000 μm.

8. A fuel cell according to claim 1, wherein said pores have a fixed lateral spacing of about 50-1000 μm.

9. A fuel cell according to claim 1, wherein said pores have a spacing varied along the in-use path or paths of a reactant stream of about 50-1000 μm.

10. A fuel cell according to claim 1, wherein said pores have a fixed lateral dimension of about 10-200 μm and a lateral spacing varied along the path or paths of the fuel stream of about 100-500 μm.

11. A fuel cell according to claim 1, wherein said pores have a lateral dimension of about 30 μm and a variation of lateral spacing of about 200-300 μm.

12. A fuel cell according to claim 1, wherein said pores have a fixed lateral spacing of about 10-500 μm and a lateral dimension varied along the in-use path or paths of a reactant gas stream of 10-500 μm.

13. A fuel cell according to claim 12, wherein said pores have a fixed lateral spacing of about 200 μm and a lateral dimension varied along the in-use path or paths of a reactant gas stream of 20-100 μm.

14. A fuel cell according to claim 1, wherein said pores have a shape selected from the group consisting of: circular, non-circular, elliptical and square.

15. A fuel cell according to claim 14, said pores being generally circular in shape and having a diameter of about 30-400 μm.

16. A fuel cell according to claim 14, the largest distance across said pores in a plane generally parallel with the surface of said metallic substrate being 0.1 to 2.0 times the thickness of said metallic substrate.

17. A fuel cell according to claim 1, wherein said pores are arranged in a pattern or are not arranged in a pattern.

18. A fuel cell according to claim 17, wherein said pores are distributed in a distorted hexagon pattern or a regular hexagon pattern.

19. A fuel cell according to claim 1, wherein said pores provide an open area of 1 to 65%, 10 to 50%, or 40% of the total surface area of said porous region of said metallic substrate.

20. A fuel cell according to claim 1, wherein the pores are of varying size through the metallic substrate.

21. A fuel cell according to claim 1, wherein said pores are at least partially filled with a porous filling material.

22. A fuel cell according to claim 21, said porous filling material being a porous sintered powder.

23. A fuel cell according to claim 22, said porous sintered powder being selected from the group consisting of: ferritic stainless steel, a mixed powder of Ni and
$Ce_{1-x}Gd_xO_{2-X/2}$ (CGO) where $0.08<x<0.25$ with a volumetric fraction of Ni ranging from 0.30 to 0.75, and a mixed powder of Ni and $Ce_{1-x}Gd_xO_{2-x/2}$ (CGO) containing at least one additive selected from the group consisting of:
$Zr_{1-x}YO_{2-x/2}$ (YSZ) where $0.03<x<0.10$, $La_2O_3$, $Cr_2O_3$, Cu, Pt, Pd, Mn and Ru, which do not to exceed 40 volume % of the total powder volume.

24. A fuel cell according to claim 22, said porous sintered powder having a relative porosity of about 30-60%.

25. A fuel cell according to claim 22, said porous sintered powder having a porosity variation along the in-use path or paths of a fuel stream from about 20 to 60 volume % of the metallic substrate and a thickness in the range from 200 to 1000 μm.

26. A fuel cell according to claim 25, said sintered metal powder having a porosity variation from about 30 to 50% and a thickness of 400 μm.

27. A fuel cell according to claim 22, said porous sintered metal powder having a porosity variation along the in-use path or paths of a fuel stream from about 20 to 60 volume % of said metallic substrate and a thickness from 200 to 1000 μm.

28. A fuel cell according to claim 27, said sintered metal powder having a porosity variation from about 30 to 50% and a thickness of 400 μm.

29. A fuel cell according to claim 21, wherein said porous filling material is a catalyst.

30. A fuel cell according to claim 21, said pores filled with a porous filling material providing a continuous surface on at least one face of said substrate.

31. A fuel cell according to claim 21, wherein said porous filling material in said pores extends on one surface of said metallic substrate to form a porous layer covering said porous region of said metallic substrate.

32. A fuel cell according to claim 31, said porous layer having mounted on it said electrode.

33. A fuel cell according to claim 31, wherein said porous layer is an electrode of said fuel cell.

34. A fuel cell according to claim 21, wherein said porous and non-porous regions of said metallic substrate are attached to said electrode of said fuel cell.

35. A fuel cell according to claim 1, wherein said at least one porous region is covered by an electrode of said fuel cell.

36. A fuel cell according to claim 1, wherein said porous region comprises a plurality of pores between opposite faces of said metallic substrate.

37. A fuel cell according to claim 36, said pores defining a fluid flow path from a first face of said substrate to a second face of said substrate upon which is mounted said electrode.

38. A fuel cell according to claim 1, said electrode being an anode.

39. A fuel cell according to claim 1, said metallic substrate comprising ferritic stainless steel.

40. A fuel cell according to claim 1, said metallic substrate having a thickness of about 100-1000 μm.

41. A fuel cell stack layer including a fuel cell according to claim 1.

42. A fuel cell stack comprising a plurality of fuel cell stack layers according to claim 41 and an end plate at each end.

* * * * *